United States Patent Office 3,258,655
Patented June 28, 1966

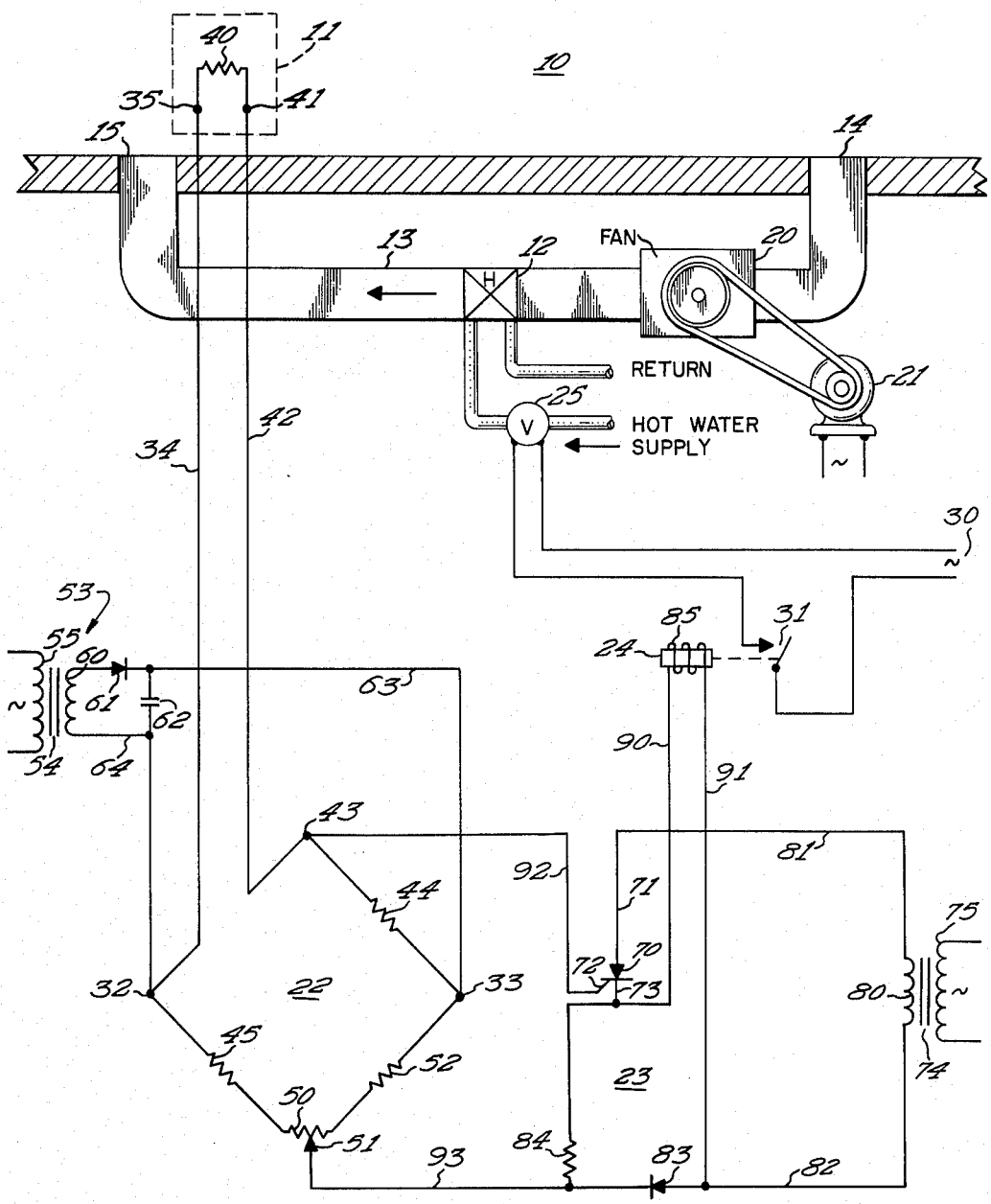

3,258,655
CONTROL APPARATUS
Balthasar H. Pinckaers, Edina, Minn., assignor to Honeywell Inc., a corporation of Delaware
Filed Mar. 13, 1963, Ser. No. 264,917
4 Claims. (Cl. 317—148.5)

The present invention is concerned with an improved switching apparatus; in particular, the switching apparatus comprises a solid state controlled rectifier which has an input from a temperature control bridge to control the operation of a relay connected to the rectifier. Upon the operation of the switching device to energize the relay, a feedback signal is available to reduce the rectifier "jitter" and stabilize the operation.

With the advent of solid state controlled rectifier switching devices, the trend is to apply these solid state devices to various control circuits in order to provide control systems which operate in a more satisfactory manner and are more economical to reduce the price to the customer. In the specific use of a solid state rectifier of the silicon controlled rectifier type, the presence of jitter or variation of switching time from one cycle to the next is quite common when an input signal of a predetermined magnitude is placed on the control or gate electrode to obtain the switching action.

In the present invention, a D.C. voltage from a temperature control circuit is applied between the gate and cathode of a silicon controlled rectifier to cause the rectifier to fire and energize a load or relay. Connected in the load energizing circuit is an impedance which provides a feedback signal to the input circuit to increase the positive voltage of the gate electrode to insure that the rectifier conducts each time the anode voltage is positive.

An object of the present invention is to provide an improved solid state rectifying control circuit with a feedback signal into the control circuit to make the rectifying operation more stable.

Another object of the present invention is to provide a silicon controlled rectifier circuit wherein upon the rectifier controlling a relay, an impedance is placed in the "free wheeling" circuit of the relay to provide a voltage which when connected in series with the input control voltage maintains the rectifier conductive.

These and other objects of the present invention will be apparent upon a study of the specification and drawings.

A single figure provides a schematic drawing of the circuit making use of the controlled rectifier for switching a temperature conditioning load in response to the output of a space thermostat.

A space 10 has a thermostat 11 for controlling the supply of heat to the space from a heat exchanger 12 connected in a duct 13 through which air is forced from a return duct 14 to a space supply duct 15 under the power of a fan 20 driven by a constant speed motor 21. Thermostat 11 is connected in a bridge circuit 22 which has an output for controlling a switching apparatus 23 connected to a control relay 24. Relay 24 controls the supply of hot water to heat exchanger 12 by energizing valve 25 to apply power through the circuit from a source of power 30 when switch 31 of relay 24 is closed.

Bridge circuit 22 comprises a pair of terminals 32 and 33 having two parallel circuits connected therebetween. A first circuit is traced from terminal 32 as follows: a conductor 34, a terminal 35 of thermostat 11, a temperature responsive resistance element or impedance 40, a terminal 41, conductor 42, a bridge output terminal 43, a fixed resistor 44, and back to terminal 33. The other circuit of the bridge is traced from terminal 32 as follows: a fixed resistor 45, potentiometer winding 50, having a movable wiper 51, a fixed resistor 52, and back to the other terminal 33.

A source of power 53 comprising a transformer 54 which has a primary winding 55 connected to a source and a secondary winding 60. Connected across winding 60 is a unidirectional current conducting device or diode 61 and a capacitor 62 to provide a relatively smooth D.C. voltage across capacitor 62 which is connected between terminals 32 and 33 of the bridge circuit by conductors 63 and 64.

Control circuit 22 comprises a silicon controlled rectifier or switching device 70 which might be a 3N58 General Electric silicon controlled rectifier. The rectifier has an anode 71, a control or gate electrode 72 and a cathode 73. The rectifier provides a switching operation each time the voltage of the anode is positive with respect to the cathode if the voltage of the gate electrode 72 is of a predetermined positive value with respect to the cathode.

A source of A.C. power of transformer 74 has a primary 75 and a secondary winding 80. Secondary 80 is connected to control device 23 in the following manner. The upper terminal of secondary 80 is connected by a conductor 81 to anode 71. The lower terminal of secondary 80 is connected by a conductor 82 through a unidirectional current conducting device or diode 83 and a resistor 84 to cathode 73. Winding 85 of relay 24 is connected between cathode 73 and conductor 82 to be in parallel with the series circuit of diode 83 and resistance 84 by conductors 90 and 91, respectively.

An output signal of bridge circuit 22 is connected to the control circuit of switching device 70 by a circuit traced as follows: a conductor 92 connects terminal 43 to gate electrode 72, and a conductor 93 connects wiper 51 to the junction of resistor 84 and diode 83.

Operation

With the power supply 53 providing a positive voltage on terminal 33 with respect to terminal 32 of bridge circuit 22, a drop in the space temperature to increase the resistance of resistor 40 would increase the output of the bridge circuit by increasing the voltage of terminal 43 with respect to terminal 51. By the adjustment of wiper 51, a predetermined temperature can be maintained in space 10. When a positive voltage output from bridge 22 is applied to gate electrode 73 and the voltage output of transformer 74 is such that the voltage of anode 71 is positive with respect to cathode 73, switching device 70 becomes conductive to provide a current through winding 85 to energize relay 24. The energization of the relay would energize valve 25 to supply hot water to heat exchanger 12. Connected in parallel with winding 85 is a "free wheeling" circuit making use of diode 83 and resistance 84. The "free wheeling" circuit maintains the relay 24 energized during the off cycle of switching device 70. As the inductive field of relay 24 collapses after switching device becomes nonconductive when the alternating voltage of transformer 74 reverses for the other half cycle to make the lower terminal of secondary 80 positive, a circulating current exists through diode 83 and resistance 84 to maintain relay 24 energized and switch 31 closed. The use of such a "free wheeling" diode is quite common in actuators which are energized by a pulsating voltage or from the half wave rectified output.

In switching device 70 the phenomena of "jitter" is quite common. Since the switching device becomes conductive or fires at a predetermined gate electrode voltage, the various voltage characteristics of the device make the device unstable. While the rectifier may fire on one cycle of the A.C. voltage from source 74 for a predetermined input voltage, the next cycle firing may not take place. In order to insure that switching device 70 is steadily conductive upon the initial firing due to the input voltage from bridge 22, a feedback signal into the signal input circuit is provided by the voltage across resistance 84. When the magnetic field of relay 24 collapses to pass the current through the "free wheeling" diode 83, a positive voltage at the lower end of resistance 84 exists with respect to cathode 73. This positive voltage is added to the output of bridge 22 to place a higher positive voltage on gate electrode 72 to maintain the switching device 70 conductive when the power to anode 71 again becomes positive on the next half cycle of the A.C. source 74.

After a few cycles of operation of rectifier 70, the voltage across resistor 84 will reach a maximum value as a result of the decaying transient voltage existing in the relay circuit on the negative half cycle of the power source 74. The positive voltage across resistance 84 is thus available to maintain the switching device operative until the temperature of the space changes to change the output of bridge circuit through a differential which is determined by this positive voltage feedback.

Obviously, the switching circuit 23 can be applied to other types of control networks where an input signal is available for controlling some sort of load. One particular example might be where a cooling system was controlled. Such a system would require a positive temperature coefficient resistor in the thermostat or a reversal of the bridge output by some conventional change. The other applications of this switching circuit to prevent the switching "jitter" would be obvious to those skilled in the art.

The applicant intends that the scope of the present invention only be limited to the breadth of the appended claims in which

I claim:

1. In a temperature control system, a bridge circuit, having two output terminals, space temperature responsive means, circuit means connecting said temperature responsive means to said bridge circuit to provide a signal between said output terminals indicative of deviation of the space temperature from a predetermined value, a silicon controlled rectifier having an anode, a cathode and a gate electrode, a resistance, circuit means including said resistance for connecting said terminals to said gate electrode and said cathode whereby said signal is impressed upon said rectifier, a source of power having two terminals, control relay means having an energization winding and being adapted to control a temperature conditioning device, a unidirectional current conducting device, circuit means connecting one of said source terminals to said anode, circuit means including said unidirectional current conducting device for connecting another of said source terminals to said resistance, and circuit means connecting said energization winding between said another terminal of said source and said cathode whereby upon energization of said energization winding a voltage is developed across said resistance to be added to said input signal to provide a differential for said rectifier.

2. In a temperature control system, a bridge circuit, having two output terminals, space temperature responsive means, circuit means connecting said temperature responsive means to said bridge circuit to provide a signal between said output terminals indicative of deviation of the space temperature from a predetermined value, a silicon controlled rectifier having an anode, a cathode and a gate electrode, an impedance, circuit means including said impedance for connecting said terminals to said gate electrode and said cathode whereby said signal is impressed upon said rectifier, a source of power having two terminals, control relay means having an energization winding and being adapted to control a temperature conditioning device, a unidirectional current conducting device, circuit means connecting one of said source terminals to said anode, circuit means including said unidirectional current conducting device for connecting another of said source terminals to said impedance, circuit means connecting said energization winding between said another terminal of said source and said cathode whereby upon energization of said winding a voltage developed across said impedance by current flow through said current conducting device is added to said input signal to bias said rectifier more conductive to increase the operating differential.

3. In a temperature control system, a signal source having a predetermined signal upon a deviation of a space temperature from a predetermined level, a semiconductor switching device having a control circuit and a switching circuit, an inductive load, a bias means, circuit means connecting said signal source and said bias means in series to said control circuit, an A.C. source of power, a unidirectional current conducting device, circuit means connecting said conducting device and said bias means in a series circuit in parallel with said load to maintain said load energized between said conductive cycles of said switching device, circuit means including said switching circuit for connecting said load to said source whereby upon energization of said load a bias signal is available when said load is energized to be added to said signal to provide a differential in said signal required to actuate said switching device.

4. In a control circuit having a solid state rectifier with an anode, cathode and control electrode, a signal circuit connected between said control electrode and said cathode, an inductive load, an A.C. source of power, unidirectional current conducting means, circuit means including said anode and said cathode for connecting said load to said source, bias means in said signal circuit for modifying an input signal when said load is energized, and connection means connecting said bias means and said unidirectional current conducting means in series in parallel with said load.

References Cited by the Examiner

UNITED STATES PATENTS

| | | | |
|---|---|---|---|
| 3,105,175 | 9/1963 | Siliani et al. | 317—148.5 |
| 3,139,562 | 6/1964 | Freeborn | 317—148.5 |
| 3,193,732 | 7/1965 | Jamieson et al. | 317—148.5 X |

OTHER REFERENCES

"Using Low Current Silicon Controlled Rectifiers and Switches"; Application Note 200.19, 3–62, General Electric Co., page 11.

STEPHEN W. CAPELLI, *Primary Examiner.*

SAMUEL BERNSTEIN, *Examiner.*

L. T. HIX, *Assistant Examiner.*